United States Patent Office 3,024,959
Patented Mar. 13, 1962

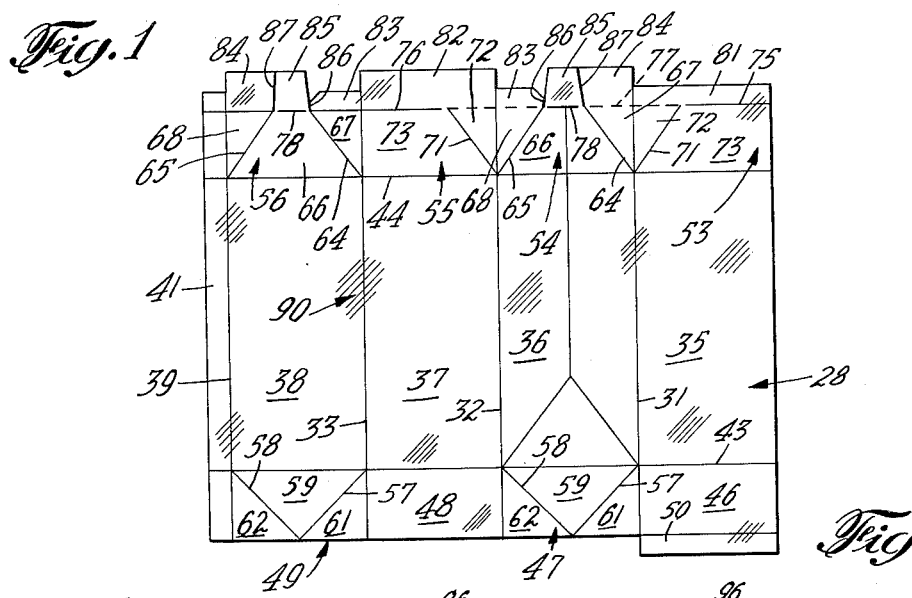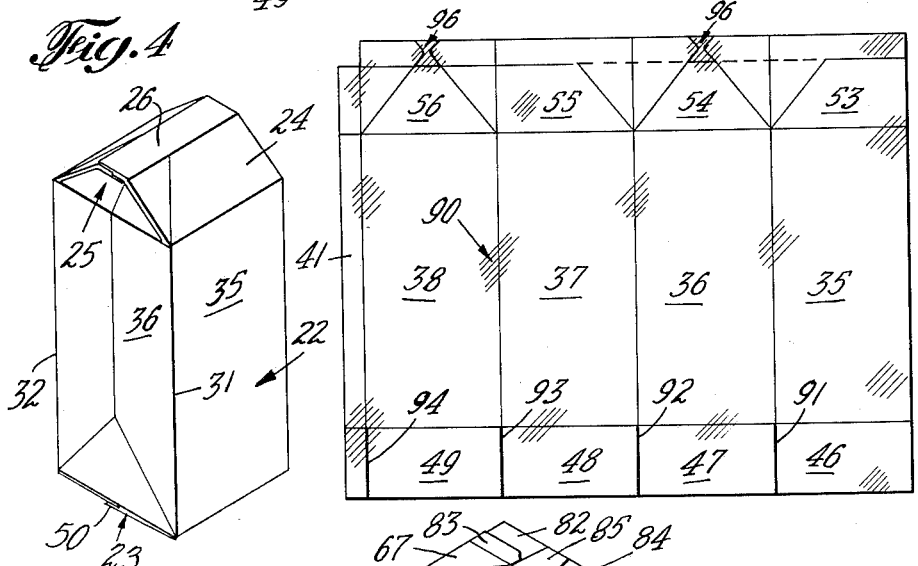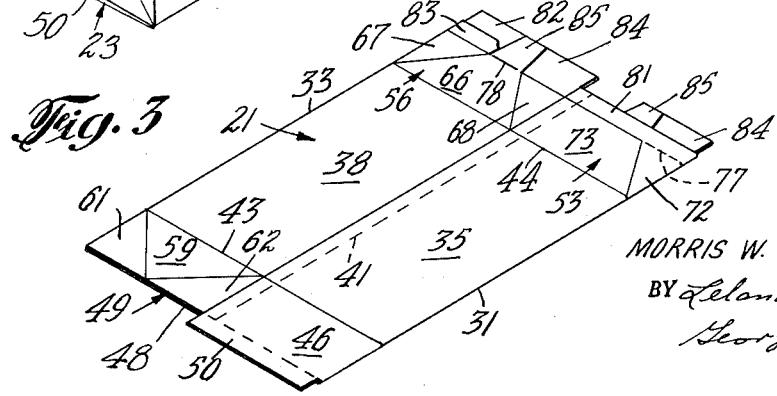

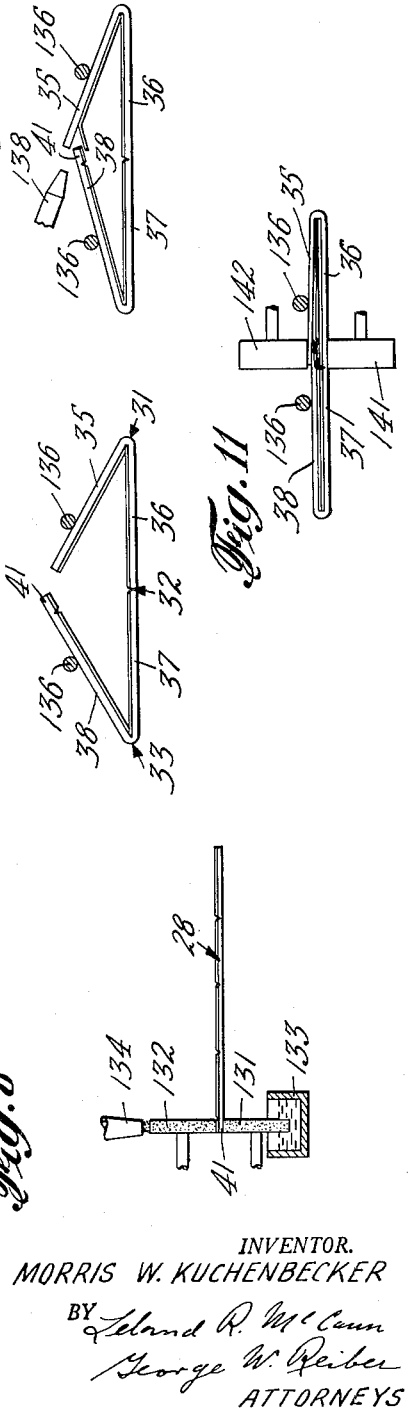

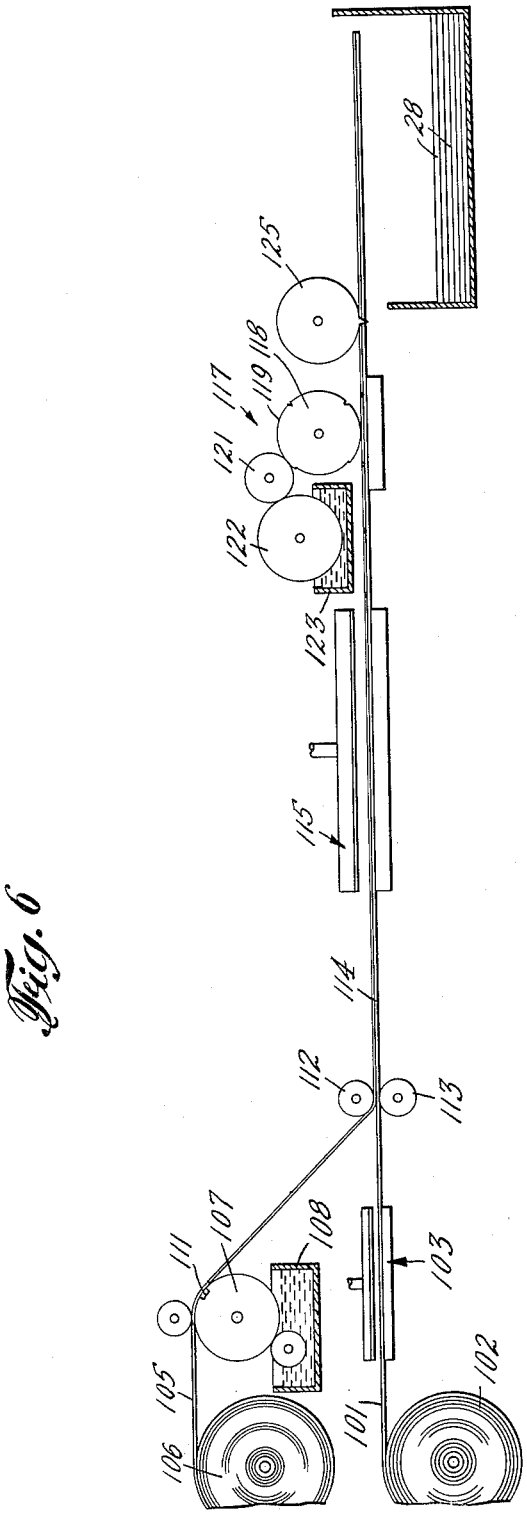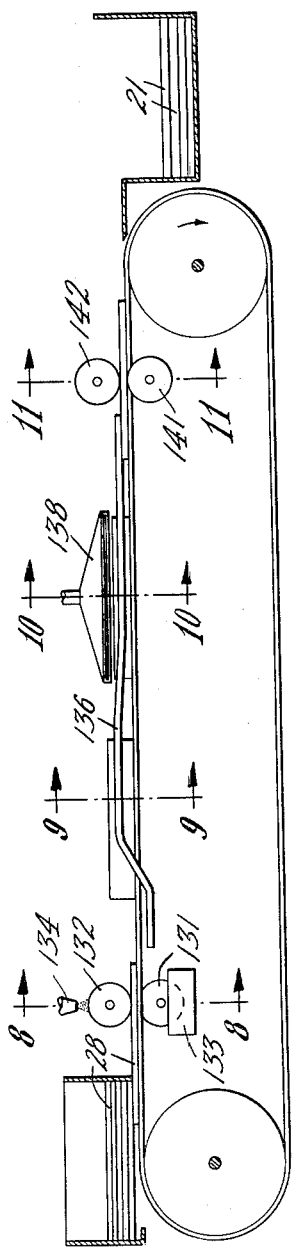

3,024,959
COLLAPSED CONTAINERS AND METHOD OF PRODUCING SAME
Morris W. Kuchenbecker, Neenah, Wis., assignor to American Can Company, New York, N.Y., a corporation of New Jersey
Filed Nov. 16, 1959, Ser. No. 853,337
11 Claims. (Cl. 229—17)

The present invention relates to a collapsed self-sustaining carton or container and a unitary blank and method of producing the blank and the container and has particularly reference to producing a blank which is lined on one face and which is provided with cut-through portions bridged by the liner.

Such a collapsed container is readily formed from paper board and the like materials for the manufacture of containers having fold-in top and bottom closures, including a conveniently available dispensing feature, for flowable products such as liquids, granulated substances and the like, the container being fully lined to render it leakproof.

An object of the invention is to provide a collapsed fibre container from a unitary blank having a configuration suitable to produce a container of the character which includes fold-in top and bottom closures and a conveniently available dispensing feature, the blank being provided with a liner sheet of the same configuration so as to protect all inner surfaces of a container made from such a blank and thereby render the resulting container leakproof.

Another object is to provide in such a blank a means of bridging over cut-through portions, such as perforated lines, slits, notches and the like openings to seal these openings against leakage in the finished container resulting from such a blank.

Another object is to provide on such a blank, a liner which may be readily torn at the cut-through portions bridged by the liner, to facilitate opening of the container made from such a blank.

Another object is to provide a method of producing a collapsed container from a blank having cut-through portions and a separate liner covering the entire blank and corresponding exactly to the configuration of the blank.

Numerous other objects and advantages of the invention will be apparent as it is better understood from the following description, which, taken in connection with the accompanying drawings, discloses a preferred embodiment thereof.

Referring to the drawings:

FIG. 1 is a plan view of one form of container blank embodying the instant invention;

FIG. 2 is a plan view of another form of container blank embodying the instant invention;

FIG. 3 is a perspective view of a flatly collapsed container ready for shipment and made from the blank shown in FIG. 1 in accordance with the method steps of the instant invention;

FIG. 4 is a perspective view of a fully erected container made from the collapsed container shown in FIG. 3;

FIG. 5 is a schematic view showing the steps of preparing the blanks shown in FIGS. 1 and 2;

FIGS. 6 and 7 are schematic side views of one form of apparatus for preparing the blanks and for forming them into collapsed containers; and FIGS. 8, 9, 10 and 11 are schematic sectional views taken substantially along the lines 8—8, 9—9, 10—10, 11—11 respectively in FIG. 7, and showing how a prepared blank is formed into a collapsed container.

As a preferred and exemplary embodiment of the instant invention the drawings illustrate a collapsed fibre container 21 (FIG. 3) and a method of producing the same ready for shipment to packing plants for erection into containers 22 (FIG. 4) and filling with products such as milk, juices, granulated substances and the like products.

The container 22 (FIG. 4) preferably is of the character having a folded-in bottom closure 23 and a similar top closure 24 including a conveniently-available dispensing feature 25 which is made available by a tearing or partial tearing away of a top closure lap seam 26.

Such a container 22 preferably is made from a unitary or one-piece blank 28 such as shown in FIG. 1. In such a blank, transverse crease lines 31, 32, 33 divide the blank into four container body side walls 35, 36, 37, 38. A similar crease line 39 sets off a glue flap 41 along the outer edge of the side wall 38. A pair of spaced longitudinal crease lines 43, 44 extending the full length of the blank divide it into bottom closure panels 46, 47, 48, 49 and top closure panels 53, 54, 55, 56. These bottom and top closure panels are hingedly connected to the respective side walls 35, 36, 37, 38 along the crease lines 43, 44.

The bottom closure panel 46 extends beyond the other bottom panels to provide an overlap seam tab 50. Two of these bottom panels 47, 49 are subdivided by diagonal crease lines 57, 58 into triangular panel sections 59 and triangular wing sections 61, 62 to permit folding of the closure panels into leakproof bottom closure forming position as shown in FIG. 4.

In a similar manner the top closure panels 54, 56 are subdivided by diagonal crease lines 64, 65 into trapezoidal panel sections 66 and triangular wing sections 67, 68 and the panels 53, 55 are subdivided by diagonal crease lines 71 into triangular wing sections 72, and rhomboidal sections 73, to permit folding of the top closure panels into leakproof top closure forming position as shown in FIG. 4.

Adjacent the top edge of the blank 28, the top closure panels 53, 54, 55, 56 are divided by a pair of coextensive crease lines 75, 76 which extend respectively across the top closure panel 53 up to its diagonal crease line 71, and across the top closure panels 55, 56 up to the diagonal crease line 71 in panel 55. For cooperation with these crease lines 75, 76 there is provided a cut-through, perforated tear line 77 which extends across the panel 54 and into the panels 53, 55 to connect with the ends of the crease lines 75, 76. A portion of this tear line 77 includes a slit 78.

The crease lines 75, 76 and the tear line 77 set off at the top edge of the blank a series of tabs which are integral extensions of the top closure panels 53, 54 55, 56. These tabs include a short tab 81 connected to the panel 53, a cooperating long tab 82 on the panel 55, short tabs 83 connected to the panels 54, 56 and to the long tab 82 on panel 55, long tabs 84 connected to the panels 54, 56 and to the short tab 81 on panel 53 and to the glue flap 41, and free central tabs 85 on the panels 54, 56. The free central tabs 85 are disposed between the short tabs 83 and the long tabs 84 on the panels 54, 56 and are separated from these tabs by cut lines 86, 87. These tabs are folded in overlapping and abutting relation to provide the top closed lap seam 26.

The inner face of the blank 28 including all of the tabs is entirely covered with a liner sheet 90 which preferably is a thing sheet of strong paper laminated to and adhesively bonded to the blank, the liner sheet having the same configuration as the blank and covering and sealing the tear line 77 and slit 78 of the container against leakage. The exposed face of the liner 90 preferably is coated with a film of polyethylene or other suitable liquid proofing substance. Similarly the exposed or outer surface of the blank 28 is coated with a film of polyethylene or other suitable liquid-proofing substance.

For shipping purposes the lined blank 28 is folded along its side wall crease lines 31, 33 to position the side walls 35, 38 in overlapping relation to the side walls 36, 37 and in this position the glue flap 41 is adhesively bonded to the side seam marginal edge portion of the side wall 35 to produce the collapsed container 21 (FIG. 3) which is ready for erection and closing in the customers plant to produce the container 22 (FIG. 4).

In a modified form of the lined blank 28, as shown in FIG. 2, for producing a similar collapsed container as shown in FIG. 3 and an erected container as shown in FIG. 4, the bottom closure panels 46, 47, 48, 49 and the glue flap 41 are separated from each other by cut lines 91, 92, 93, 94. At the top edge of the blank, the free central tabs 85 are omitted and are replaced by notches 96 which are cut into the blank but which are bridged across by the liner sheet 90 to provide for a folding of the liner sheet at the notches when the tabs are incorporated in the seam 26. This folding of the liner sheet across the notches 96 seals them against leakage when the container is erected, filled and sealed.

The method of producing the lined blank 28 and the collapsed container 21 will now be explained.

The blanks 28 preferably are produced from substantially continuous webs of material. For this purpose a web 101 (FIG. 6) of body material is fed from a roll 102 of such material and is first advanced into and through a pre-cutting station at which there is located a pre-cutting die mechanism 103. At this station the tear line 77 and slit 78, of the blank 28 (FIG. 1) or the notches 96 and bottom closure panel cut lines 91, 92, 93, 94 of the modified blank (FIG. 2), are cut in the web 101 as shown in FIG. 5.

As the next step in this method and beyond the pre-cutting station the liner sheet 90 is laminated to the body material. This liner sheet preferably is a continuous web 105 of paper having one face coated with polyethylene, which is fed from a roll 106 of such material, and is first passed over an adhesive applying roller 107 of a glue pot 108 to apply a suitable adhesive to the uncoated face of the web. The adhesive roller 107 preferably is of a circumference equal to the length of a blank 28 and is formed with a transverse notch 111 to leave uncoated, a narrow transverse section, substantially equal in width to the glue flap 41 of the blank to provide a loose side seam portion of the liner sheet along the edge of the blank 28 opposite the glue flap edge in relation to the pre-cut score line 77 for a purpose to be hereinafter explained.

From the adhesive applying roller 107, the web 105 of liner material advances into and through a laminating station where the liner web is pressed into tight engagement with the body material as shown in FIGS. 5 and 6 by passage between a pair of pressure rollers 112, 113. These pressure rollers firmly bond the liner sheet, except the loose side seam portion, to the body material and thereby cover and seal any openings such as the tear line 77, slit 78, or notches 96 and cut lines 91, 92, 93, 94 in the body material. The result of this operation is a laminated web 114.

Following the laminating step, the laminated web 114 passes into and through a blanking station which includes a blank creasing and cutting mechanism 115. At this station the creasing and cutting mechanism 115 impresses the various crease lines of the blank into the laminated web in relation to the pre-cut score line 77 and cuts the outline of the upper and lower edges of the blank to produce the closure panels and tabs and the cut lines 86, 87 for the free tabs 85, to fully define the blank as shown in FIG. 5.

With the crease lines and cut lines produced in the laminated web, the web advances into and through an adhesive applying station which includes preferably a hot melt applicator 117. At this station a quick drying thermoplastic adhesive is applied to the liner web 105 in the areas over the bottom closure triangular wing sections 61, 62 (see FIG. 5) and the bottom seam tab 50, and the top closure tabs 82, 83, 84, 85. For this purpose the applicator 117 is provided with an applicator wheel 118 of a circumference equal to the length of a container blank 28 and having raised portions 119 corresponding to the spots on the blank where the adhesive is to be applied. These raised portions 119 receive adhesive from a transfer roller 121 which rides on an adhesive roller 122 in an adhesive bath 123.

Following this adhesive applying step, and after permitting the adhesive to dry, the laminated web 114 advances into and through a blank cut-off station where a rotary knife 125 or other suitable device cuts the web 114, transversely along a line coincident with the outer edge of the glue flap 41 of the blank. This operation severs a laminated blank 28 from the web, with the free unglued portion of the liner sheet disposed adjacent the outer side seam edge of the container side wall 35 in the blank.

The flat laminated blank 28 is now ready for additional operations to convert it into the collapsed container 21. For this purpose the drawings show the blank 28 being fed into stacked formation as they are cut from the laminated web 114, for transfer to a subsequent operation mechanism in which they are individually fed from the stack for the subsequent operations. However, this stacking step may be omitted and the cut-off blanks 28 advanced directly into the subsequent operation mechanism, if desired.

In the subsequent operation mechanism as shown in FIGS. 7, 8, 9, 10, 11, a flat laminated blank 28 is fed into and through an adhesive applying station where adhesive is applied preferably to both surfaces of the blank glue flap 41. This adhesive applying step preferably is effected by passage of the blank between a pair of adhesive applying rollers 131, 132 (FIGS. 7 and 8) which are supplied with adhesive from a bath 133 and/or a nozzle 134.

With the glue flap 41 carrying its adhesive, the blank is advanced into and through a folding station where the blank is folded along its side wall crease lines 31, 33 (FIG. 1) to locate the adhesive coated glue flap 41 and the outer side seam edge of the blank side wall 35 into adjacent position as shown in FIG. 9. This folding of the blank preferably is effected by curved rods 136 (FIGS. 7 and 9) disposed along the path of travel of the blank. This is a conventional folding device.

While the glue flap 41 and its opposed side seam edge are in this position, the blank is advanced into and through a liner separation station where the free unglued portion of the liner 90 and the side seam edge portion of the blank side wall 35 are spread apart to receive between them the adhesive coated glue flap 41. This separation or spreading apart of the liner 90 and the wall 35 may be effected in any suitable manner by bending the edge of the blank wall upwardly or by pressing the liner edge downwardly. By way of example, the drawing shows an air blast nozzle 138 (FIGS. 7 and 10) disposed adjacent the path of travel of the blank 28 and inclined to blow a blast of air against the edge of the blank to separate the free portion of the liner from the side wall 35 (FIG. 10).

While the free portion of the liner 90 and the overlying portion of the blank wall 35 are held spread apart, the adhesive coated glue flap 41 is interposed in the space between them and the folded walls of the blank are then pressed down against the unfolded walls to position the blank walls in fully collapsed container body position as shown in FIG. 11. This may be effected in any suitable manner, preferably by extensions of the curved rods 136.

The collapsed blank is then advanced into and through a side seam sealing station where the free portion of the liner 90 and the adjacent portion of the blank side wall 35 are pressed tightly against the adhesively coated glue flap 41 interposed between them to produce a tight side seam in which the raw edge of the glue flap 41 is disposed in a protected position in the seam. This step preferably is effected by passing the side seam area of the collapsed blank between a pair of pressure rollers 141, 141 as shown in FIG. 11. The collapsed blank is discharged from the pressure rollers as the complete collapsed container 21 and in this collapsed condition is ready for shipment to the customer for subsequent erection into a container. This completes the method of producing the collapsed container 21.

It is thought that the invention and many of its attendant advantages will be understood from the foregoing description, and it will be apparent that various changes may be made in the form, construction and arrangement of the parts and that changes may be made in the steps of the method described and their order of accomplishment without departing from the spirit and scope of the invention or sacrificing all of its material advantages, the form hereinbefore described being merely a preferred embodiment thereof.

I claim:

1. An article of manufacture adapted to be folded into a tubular self-sustaining container having integral top and bottom end closures, said article comprising a unitary fibre blank and an impervious liner sheet, said blank having a body portion transversely creased to define four substantially rectangular side walls and a lap side seam portion adjacent one of said side walls, said blank adjacent its top and bottom edges having a crease line extending longitudinally of said blank for its full length including said lap side seam portion, said crease lines defining at the top and bottom edges and in alternating order pairs of oppositely disposed outer and inner closure panels forming integral extensions of said side walls next adjacent thereto and adapted to be folded into said top and bottom end closures for the container, said blank including tab portions adjacent to and extending from preselected closure panels to provide for uniting said pair of outer and inner closure panels at said top edge in an end seam when the blank is folded into a container, said blank including a cut-through portion adjacent said tabs to define a weakened tear portion to facilitate opening a container made from said article by separating the tab from the adjacent closure panel, said impervious liner sheet being of the same size and configuration as said blank and entirely covering said blank and bridging across said cut-through portion, and means bonding said liner sheet to said blank at least substantially throughout the area of said blank.

2. An article of manufacture of the character defined in claim 1, wherein said liner sheet is provided with crease lines coincident with the crease lines in said blank to effect folding of said liner sheet with said blank.

3. An article of manufacture of the character defined in claim 1 wherein the outer exposed face of said blank is coated with polyethylene and wherein the outer exposed face of said liner sheet is coated with polyethylene.

4. An article of manufacture of the character defined in claim 1 wherein said cut-through portion is a perforated tear line.

5. An article of manufacture of the character defined in claim 1 wherein said cut-through portion is an open notch.

6. The article of manufacture as defined in claim 1 additionally including said liner sheet constituting a thin fiber laminate having one face coated with liquid proofing substance.

7. A container constructed from the article of manufacture as defined in claim 1.

8. A self-sustaining collapsed container having integral top and bottom end closures formed from a unitary blank, said collapsed container comprising a body portion having four substantially rectangular side walls and a lap side seam portion separated from each other and hingedly connected by crease lines, two of said side walls being folded along their crease lines into overlapping relation to the remaining two side walls, and said lap side seam portion being secured to the inner face of the free side seam portion of the overlapped side wall adjacent thereto to unite said body side walls in a lap side seam, said collapsed container adjacent its top and bottom edges having crease lines normal to said side wall crease lines and defining in alternating order pairs of oppositely disposed outer and inner closure panels forming integral extensions of said side walls for folding into top and bottom end closures, said container including tab portions extending from said top end closure panels to provide for uniting said top closure panels in an end seam, and a liner sheet secured to the inner face of said collapsed container, said liner sheet being of the same size and configuration as said container and covering the entire face of said container including said top and bottom end enclosures and said tabs, said liner sheet being of the same size and configuration as said container and covering the entire face of said container including said top and bottom end closures and said tab, said liner sheet having side seam marginal edge portions overlying said side seam portions of said container respectively, one of said side seam portions and its overlying one of said marginal edge portions extending between the other of said side seam portions and other of said marginal edge portions, said marginal edge portions of said liner sheet thereby being disposed in overlapping contact with each other at said container side seam, said marginal edge portions of said liner sheet being secured together and being secured to said container lap seam and enclosing the inner raw edge of said container at said side seam.

9. A collapsed container of the character defined in claim 8 wherein said body portion is provided with a cut-through portion to facilitate opening of a sealed container erected from said collapsed container, and wherein said liner sheet covers and seals said cut-through portion in said collapsed container.

10. A collapsed container of the character defined in claim 8 wherein the outer exposed faces of said collapsed container and the inside exposed faces of said liner sheet are coated with polyethylene.

11. A self-sustaining collapsed container as defined in claim 8 additionally including said liner sheet constituting a thin fiber laminate having one face coated with liquid proofing substance.

References Cited in the file of this patent

UNITED STATES PATENTS

| | | |
|---|---|---|
| 2,158,097 | Wentz | May 16, 1939 |
| 2,326,269 | Waters | Aug. 10, 1943 |
| 2,423,804 | Waters | July 8, 1947 |
| 2,750,095 | Alden | June 12, 1956 |
| 2,801,577 | Ingham | Aug. 6, 1957 |
| 2,801,782 | Ingham | Aug. 6, 1957 |
| 2,959,336 | Mosse et al. | Nov. 8, 1960 |